(12) United States Patent
Scribner

(10) Patent No.: US 6,640,379 B1
(45) Date of Patent: Nov. 4, 2003

(54) ATTACHABLE EYEGLASS WIPERS

(76) Inventor: Ralph E. Scribner, 691 E. Naples Dr., #C, Las Vegas, NV (US) 89119

( * ) Notice: Subject to any disclaimer, the term of this patent is extended or adjusted under 35 U.S.C. 154(b) by 147 days.

(21) Appl. No.: 10/039,428

(22) Filed: Jan. 4, 2002

(51) Int. Cl.[7] ............................. B60S 1/56; B60S 1/02
(52) U.S. Cl. .................... 15/250.3; 15/250.27; 351/158
(58) Field of Search ................ 15/230.3, 250.31, 15/250.001, 250.27, 250.18, 250.15; 351/158, 62

(56) References Cited

U.S. PATENT DOCUMENTS

| | | | |
|---|---|---|---|
| 1,509,699 A | * 9/1924 | Atchison | 15/250.27 |
| 2,329,757 A | * 9/1943 | Greenfield | 15/250.28 |
| 2,888,703 A | * 6/1959 | Karwowska | 15/250.27 |
| 3,754,298 A | * 8/1973 | Menil | 15/250.3 |
| 4,027,354 A | 6/1977 | Burpee | 15/250.3 |
| 4,215,437 A | 8/1980 | Kao | 2/424 |
| 4,633,532 A | 1/1987 | Yagasaki | 15/250.3 |
| 4,782,548 A | 11/1988 | Wong | 15/250.21 |
| 4,789,233 A | * 12/1988 | Arsenault et al. | 351/158 |
| 5,264,875 A | 11/1993 | Cooper | 351/44 |
| 5,847,654 A | 12/1998 | Hog | 318/DIG. 2 |
| 6,139,142 A | 10/2000 | Zelman | 351/57 |
| 6,175,205 B1 | 1/2001 | Michenfelder et al. | 318/444 |

FOREIGN PATENT DOCUMENTS

| | | | | |
|---|---|---|---|---|
| DK | 66637 | * | 4/1948 | 15/250.3 |
| FR | 708760 | * | 5/1931 | 15/250.3 |
| FR | 1151821 | * | 8/1957 | 15/250.3 |
| GB | 413447 | * | 7/1934 | 15/250.3 |

OTHER PUBLICATIONS

N.Y. Daily News, Magazine Section, Mar. 4, 1956.*
Washington Star, Sunday Publication, 1959.*

* cited by examiner

*Primary Examiner*—Gary K. Graham
(74) *Attorney, Agent, or Firm*—John D. Gugliotta

(57) ABSTRACT

A clip-on wipers are provided that attach to eyeglasses to prevent the buildup of raindrops or snow on the lenses. It attaches via a clip-on clamp thus allowing it to be removed when not needed. A battery pack, envisioned consisting of AAA batteries supplies power to a two-speed motor, via a control switch. The motor then drives a reciprocating mechanical linkage, which moves two small wiper blades across the surface of the lenses. Such action keeps the lenses free from rain and snow buildup when the glasses are worn outdoors in inclement weather.

9 Claims, 3 Drawing Sheets

ATTACHABLE EYEGLASS WIPERS

RELATED APPLICATIONS

The present invention was first described in Disclosure Document Registration No. 497,785 filed on Aug. 1, 2001 under 35 U.S.C. §122 and 37 C.F.R. §1.14, but not yet returned. There are no previously filed, nor currently any co-pending applications, anywhere in the world.

BACKGROUND OF THE INVENTION

1. Field of the Invention

The present invention relates generally to eyeglass attachments and, more particularly, to a clip-on, motorized wiper attachment for affixing to conventional eyewear.

2. Description of the Related Art

Wearing eyeglasses during inclement weather such as rain or snow is an aggravating experience. As if general visibility conditions are not bad enough, the eyeglass wearer is additionally plagued by the accumulation of raindrops or snow on their lenses. One must continually stop whatever they are doing to wipe their glasses clean. Another option is to simply remove the glasses and store them in a dry pocket, purse or similar place until the person is out of the rain or snow. This action of course ends up making the situation worse, since now the person has their glasses off and cannot see. While these situations are troubling for those caught outside in a sudden storm, they may be weekly or even daily occurrences for those who must work outdoors no matter the weather. Such job positions would include emergency personnel, mail delivery persons, runners, construction workers and the like.

A search of the prior art did not disclose any patents that read directly on the claims of the instant invention; however, the following references were considered related:

| U.S. Pat. No. | Inventor | Issue Date |
| --- | --- | --- |
| 6,175,205 | Michenfelder et al. | Jan. 16, 2001 |
| 5,847,654 | Hog | Dec. 8, 1998 |
| 4,633,532 | Yagasaki | Jan. 6, 1987 |
| 4,215,437 | Kao | Aug. 5, 1980 |
| 6,139,142 | Zelman | Oct. 31, 2000 |
| 5,264,875 | Cooper | Nov. 23, 1993 |
| 4,782,548 | Wong | Nov. 8, 1988 |
| 4,027,354 | Burpee | Jun. 7, 1977 |

Consequently, there exists a need for a means by which eyeglass wearers can maintain clear vision during rain and snow in a manner, which is quick, easy and effective.

SUMMARY OF THE INVENTION

It is therefore an object of the present invention to provide an improved clip-on, motorized wiper attachment for affixing to conventional eyewear.

It is a feature of the present invention to provide an improved clip-on, motorized wiper attachment for affixing to conventional eyewear that can be affixed to any conventional pair of eyewear.

Briefly described according to one embodiment of the present invention, clip-on wipers are provided that attach to eyeglasses to prevent the buildup of raindrops or snow on the lenses. It attaches via a clip-on clamp thus allowing it to be removed when not needed. A battery pack, envisioned consisting of AAA batteries supplies power to a two-speed motor, via a control switch. The motor then drives a reciprocating mechanical linkage, which moves two small wiper blades across the surface of the lenses. Such action keeps the lenses free from rain and snow buildup when the glasses are worn outdoors in inclement weather. Clear vision not only saves time from having to continually wipe the glasses, but also increases user safety as well.

It is envisioned that the invention could be adapted for use on face shields such as those used on motorcycle helmets as well.

The use of the present invention allows those who wear eyeglasses outside in rain and snow, the ability to see more clearly in a manner, which is not only easy and efficient but safer as well.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

Figure 1:
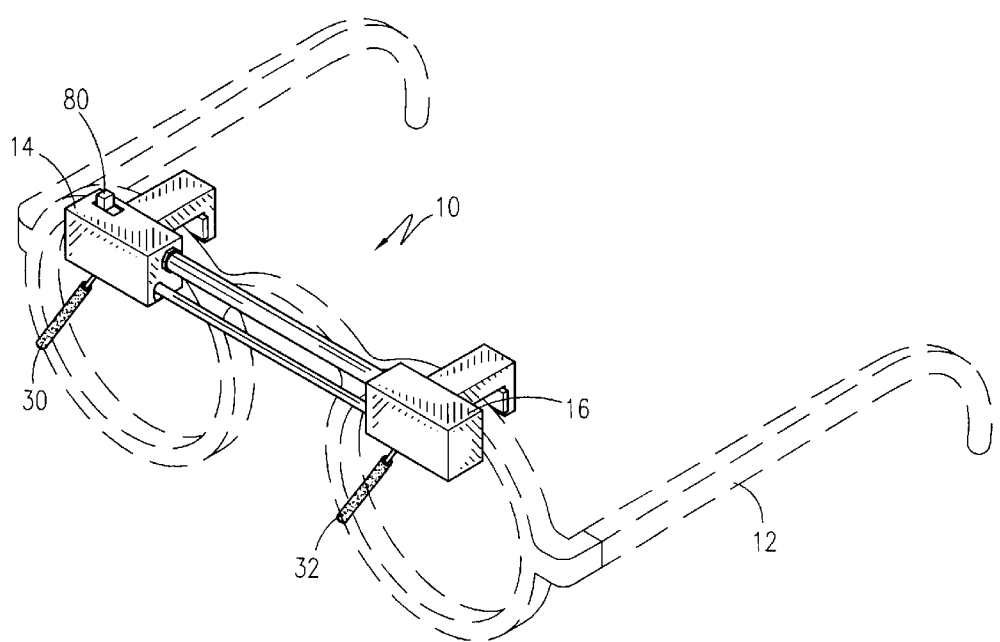
FIG. 1 is a perspective view of a clip on wipers for eyeglasses according to the preferred embodiment of the present invention.
Figure 2:
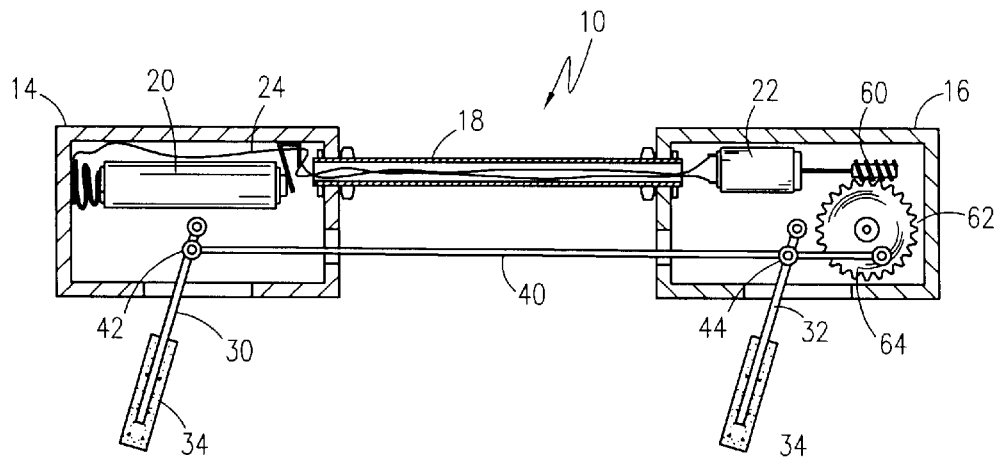
FIG. 2 is a front elevational view shown in a cross section.

The best mode for carrying out the invention is presented in terms of its preferred embodiment, herein depicted within the Figures.

1. Detailed Description of the Figures

Referring now to FIGS. 1–4, a clip-on wipers 10 are provided that attach to eyeglasses 12 is shown, according to the present invention. A first housing 14 is rigidly affixed to a second housing 16 and separated by a rigid housing support 18. The first housing 14 houses a battery 20. The second housing 16 houses a drive motor 22. The rigid housing support 18 is formed as a hollow, elongated tube affixed in rigid mechanical contact at each end to a housing and in fluid communication with the interior cavity of each housing. Electrical communication wiring 24 is in electrical contact between the battery 20 in the first housing 14 and the drive motor 22 in the second housing 16 via a hollow shaft within the rigid housing support 18.

Pivotally mounted within the first housing 14 and extending downward therefrom is a first wiper arm 30. Pivotally mounted within the second housing 16 and extending downward therefrom is a second wiper arm 32. Each wiper arm 30, 32 is formed of a linearly elongated shaft supporting a wiper 34, shown herein as a cellular foam pad circumscribing the lower shaft portion of each wiper. A reciprocating mechanical linkage 40 is linearly elongated and has a first connection 42 opposite a second connection 44. The first connection 42 is pivotally affixed to the first wiper arm 30, and the second connection 44 is pivotally affixed to the second wiper arm 32 such that the two wiper arms are in synchronous mechanical connection.

Figure 3:
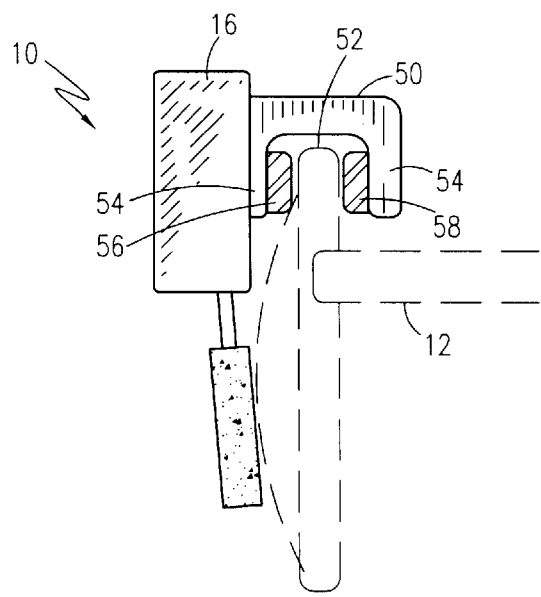
FIG. 3 is a side elevational view shown affixed to a conventional pair of eyeglasses shown in dashed lines.
Figure 4:
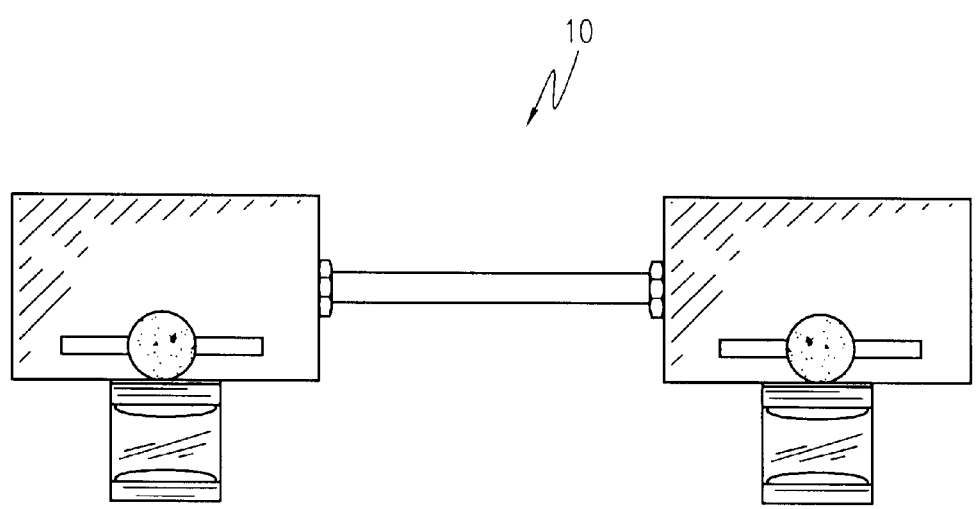
FIG. 4 is a bottom plan view thereof.

In conjunction with the other figures, FIG. 3 shows in greater detail the intended connection of the wipers 10 to the glasses 12 according to a prefferred embodiment in which each housing 14, 16 have a rearward cantilever extended attachment clap 50 affixed to the rear of each housing. Each attachment clamp 50 is formed in a general "C" shape and forming a frame receiving slot 52 between a pair of opposed clamp arms 54. A front contact grommet 56 is affixed to the surface of the front clamp arm; a rear contact grommet 58 is affixed to the surface of the rear clamp arm. In this manner, the upper frame portion of a pair of eyeglasses 12 can be physically, mechanically impinged between the grommets 56, 58 such as to support the housings 14, 16 to the eyeglasses 12 in a manner that allows the wipers 34 to contact the lens surface of the glasses.

2. Operation of the Preferred Embodiment

In operation, the present invention is affixed to the upper frame of any conventional eyeglasses by impinging the frame element between the front and rear contact grommets. In this manner, the wiper arms 30, 32 extend downward with the wipers 34 in contact with the front surface of the lenses. A power control 80 allows the user to turn on the control motor 22. The motor 22 rotates a worm drive 60 that is interlaces with a drive gear 62 housed within the second housing 16. A drive linkage 64 is pivotally affixed at one end to the drive gear 62 and at the opposite end to the reciprocating mechanical linkage 40 such that as the drive gear 62 rotates, the wiper arms 32 are reciprocated in unison such as to allow the wipers 34 to clear the front surface of the eyeglasses.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be limited only by the following claims.

What is claimed is:

1. Wipers for attachment to otherwise conventional eyeglasses, said wipers comprising:
    a first housing for housing a battery;
    a second housing rigidly affixed to said first housing and separated by a rigid housing support, said second housing for housing a drive motor;
    said rigid housing support formed as a hollow, elongated tube affixed in rigid mechanical contact at each end to one said housing and in fluid communication with an interior cavity of each said housing;
    electrical communication wiring in electrical contact between the battery in the said first housing and the drive motor in said second housing via a hollow shaft within said rigid housing support;
    a first wiper arm pivotally mounted within said the first housing and extending downward therefrom is a first wiper arm; and
    a second wiper arm pivotally mounted within said second housing and extending downward therefrom is a second wiper arm; and wherein the intended connection of the wipers to a conventional pair of eyeglasses is via a rearward cantilever extended attachment clamp affixed to the rear of each housing.

2. The wipers of claim 1, wherein each wiper arm is formed of a linearly elongated shaft supporting a wiper pad.

3. The wiper of claim 2, wherein said wiper pad is comprised of a cellular foam pad circumscribing the lower shaft portion of each wiper.

4. The wiper of claim 1, further comprising a linearly elongated reciprocating mechanical linkage having a first connection opposite a second connection, the first connection being pivotally affixed to said first wiper arm and the second connection being pivotally affixed to said second wiper arm such that the two wiper arms are in synchronous mechanical connection.

5. The wiper of claim 4, further comprising a power control that allows the user to turn on or off said control motor.

6. The wiper of claim 5, wherein said motor rotates a worm drive 60 that is interlaced with a drive gear housed within the second housing.

7. The wiper of claim 6, wherein a drive linkage is pivotally affixed at one end to the drive gear and at the opposite end to the reciprocating mechanical linkage such that as the drive gear rotates, said wiper arms are reciprocated in unison such as to allow the wiper pads to clear the front surface of the eyeglasses.

8. The wiper of claim 1, wherein each attachment clamp is formed in a general "C" shape and forming a frame receiving slot between a pair of opposed clamp arms.

9. The wiper of claim 8, wherein each said attachment clamp further comprises:
    a front contact grommet affixed to a surface of the front clamp arm; and
    a rear contact grommet affixed to a surface of the rear clamp arm, such that an upper frame portion of a pair of eyeglasses can be physically, mechanically impinged between said grommets.

* * * * *